United States Patent
Liu et al.

(10) Patent No.: US 11,947,181 B2
(45) Date of Patent: Apr. 2, 2024

(54) FOCUSING ASSEMBLY AND HEAD-MOUNTED DISPLAY DEVICE

(71) Applicants: Beijing BOE Optoelectronics Technology Co., Ltd., Beijing (CN); BOE Technology Group Co., Ltd., Beijing (CN)

(72) Inventors: Yuhong Liu, Beijing (CN); Zhanshan Ma, Beijing (CN); Haoran Jing, Beijing (CN); Zheng Ge, Beijing (CN); Zhiyu Sun, Beijing (CN); Jinbao Peng, Beijing (CN); Hao Zhang, Beijing (CN); Wenhong Tian, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 622 days.

(21) Appl. No.: 17/263,578

(22) PCT Filed: Apr. 17, 2020

(86) PCT No.: PCT/CN2020/085328
§ 371 (c)(1),
(2) Date: Jan. 27, 2021

(87) PCT Pub. No.: WO2021/208073
PCT Pub. Date: Oct. 21, 2021

(65) Prior Publication Data
US 2022/0113490 A1 Apr. 14, 2022

(51) Int. Cl.
*G02B 7/04* (2021.01)
*G02B 7/02* (2021.01)
(Continued)

(52) U.S. Cl.
CPC ............... *G02B 7/04* (2013.01); *G02B 7/026* (2013.01); *G02B 27/0006* (2013.01); *G02B 27/0172* (2013.01)

(58) Field of Classification Search
CPC ...... G02B 7/04; G02B 7/026; G02B 27/0172; G02B 27/0176; G20B 27/0006
(Continued)

(56) References Cited

U.S. PATENT DOCUMENTS

2001/0015860 A1* 8/2001 Nomura ............... G02B 7/10
359/701
2007/0297070 A1 12/2007 Shimizu
(Continued)

FOREIGN PATENT DOCUMENTS

CN 206112621 U 4/2017
CN 207133490 U 3/2018
(Continued)

OTHER PUBLICATIONS

China National Intellectual Property Administration, First office action of Chinese application No. 202080000566.8 dated Mar. 11, 2023, which is foreign counterpart application of this US application.
(Continued)

*Primary Examiner* — Ricky D Shafer
(74) *Attorney, Agent, or Firm* — Lippes Mathias LLP

(57) ABSTRACT

Provided is a focusing assembly including a focusing barrel and a barrel retaining ring; the focusing barrel includes a first sleeve, a second sleeve, and a third sleeve that are sequentially sleeved from inside to outside of the focusing barrel; the first sleeve is provided with a lens mounting portion for mounting a focusing lens, a first end of the second sleeve is provided with a display screen mounting portion for mounting a display screen, a second end of the second sleeve is
(Continued)

detachably connected to the barrel retaining ring, the first end and the second end being opposite ends of the second sleeve; and the lens mounting portion and the display screen mounting portion are configured such that the relative position thereof in a focusing direction of the focusing assembly is adjustable.

20 Claims, 6 Drawing Sheets

(51) Int. Cl.
    *G02B 27/00*     (2006.01)
    *G02B 27/01*     (2006.01)

(58) Field of Classification Search
    USPC ....... 359/611, 612, 694, 696, 699, 700, 701, 359/703, 704, 706, 507
    See application file for complete search history.

(56) References Cited

U.S. PATENT DOCUMENTS

2014/0376104 A1    12/2014    Fujinaka
2019/0302394 A1    10/2019    Zhou et al.

FOREIGN PATENT DOCUMENTS

| CN | 207318818 U | 5/2018 |
| CN | 207336957 U | 5/2018 |
| CN | 207867134 U | 9/2018 |
| CN | 110109250 A | 8/2019 |
| CN | 110133851 A | 8/2019 |
| CN | 110646912 A | 1/2020 |

OTHER PUBLICATIONS

Extended European search report of counterpart European application No. 20900694.9 dated May 26, 2023.

* cited by examiner

FOCUSING ASSEMBLY AND HEAD-MOUNTED DISPLAY DEVICE

CROSS-REFERENCE TO RELATED APPLICATION

This application is a 371 of PCT Application No. PCT/CN2020/085328 filed on Apr. 17, 2020, the entire contents of which are incorporated herein by reference.

TECHNICAL FIELD

The present disclosure relates to the field of virtual reality technology, and in particular to a focusing assembly and a head-mounted display device.

BACKGROUND

Head-mounted display devices are devices that may be worn on a user's head, for example, virtual reality (VR) display devices such as VR glasses or VR helmets. A VR display device may implement VR displaying by guiding a user to feel like being in a virtual environment by means of isolating the user's visual and auditory senses from the physical world.

Currently, a focusing assembly of a VR display device usually includes a focusing barrel, a lens, a display screen, and the like. The focusing barrel may adjust a virtual image distance of the VR display device by adjusting the relative position of the lens and the display screen. When the interior of the focusing barrel is contaminated by foreign matters, it is usually necessary to disassemble the focusing assembly for removing the foreign matters to prevent the display effect of the VR display device from being affected by the foreign matters.

However, in a current VR display device, the disassembly and assembly processes of a focusing assembly thereof are complex.

SUMMARY

Embodiments of the present disclosure provide a focusing assembly and a head-mounted display device. The technical solutions of the present disclosure are as follows:

In one aspect, embodiments of the present disclosure provide a focusing assembly, including: a focusing barrel and a barrel retaining ring, wherein
the focusing barrel includes a first sleeve, a second sleeve, and a third sleeve that are sequentially sleeved from inside to outside of the focusing barrel;
wherein the first sleeve is provided with a lens mounting portion for mounting a focusing lens, a first end of the second sleeve is provided with a display screen mounting portion for mounting a display screen, an opposite second end of the second sleeve is detachably connected to the barrel retaining ring;
wherein the lens mounting portion and the display screen mounting portion are configured such that the relative position thereof in a focusing direction of the focusing assembly is adjustable.

Optionally, the first sleeve is provided with a first guiding portion, the second sleeve is provided with a second guiding portion, and the third sleeve is provided with a third guiding portion;
wherein the first guiding portion is configured to match the second guiding portion in the focusing direction and to match the third guiding portion in a rotation direction with the focusing direction being a rotation axis direction; and the third sleeve is configured to drive the third guiding portion to rotate in the rotation direction or a direction opposite to the rotation direction, such that the first sleeve is moved along the focusing direction under guidance of the first guiding portion and the second guiding portion, thus adjusting the relative position of the display screen mounting portion and the lens mounting portion.

Optionally, the second guiding portion includes a guiding groove extending along a height direction of the second sleeve and is configured to penetrate through the second end of the second sleeve, and the barrel retaining ring is provided with a plug arranged in the second guiding portion at the second end of the second sleeve.

Optionally, the third guiding portion includes a guiding groove spirally extending along an inner wall of the third sleeve and is configured to penetrate through the inner wall of the third sleeve; and
the focusing assembly further includes: a first dust-proof member which at least wraps an area of the third sleeve where the third guiding portion is arranged.

Optionally, the first dust-proof member wraps an outer wall of the third sleeve and the area of the third sleeve where the third guiding portion is arranged.

Optionally, the first dust-proof member includes any one of a dust-proof tape or a thermoplastic tube.

Optionally, the first sleeve is provided with a plurality of first guiding portions, the second sleeve is correspondingly provided with a plurality of second guiding portions, the third sleeve is correspondingly provided with a plurality of third guiding portions, and the barrel retaining ring is correspondingly provided with a plurality of plugs;
wherein the first guiding portion includes a guiding post and is arranged on an outer wall of the first sleeve; the plurality of first guiding portions are arranged in the plurality of second guiding portions in a one-to-one correspondence, the plurality of first guiding portions are arranged in the plurality of third guiding portions in a one-to-one correspondence, and the plurality of plugs are arranged in the plurality of second guiding portions at the second end of the second sleeve in a one-to-one correspondence.

Optionally, a gap between the first sleeve and the second sleeve and a gap between the second sleeve and the third sleeve are both filled with a dust-proof material.

Optionally, the dust-proof material includes any one of grease or damping oil.

Optionally, the focusing assembly further includes: a mounting base, a display screen, a screen cover and a second dust-proof member;
wherein the mounting base is fixedly connected to or integrally formed with the first end of the second sleeve; the display screen mounting portion is arranged on a surface of the mounting base distal from the second sleeve, and the display screen is mounted in the display screen mounting portion; the screen cover is disposed at a side of the display screen distal from the mounting base; the screen cover and the mounting base enclose the display screen; and the second dust-proof member is filled in a gap between the display screen and the mounting base.

Optionally, the screen cover is detachably connected to the mounting base.

Optionally, the screen cover is provided with a dust-proof portion which at least encloses the display screen mounting portion, such that the screen cover and the mounting base enclose the display screen.

Optionally, the dust-proof portion encloses a surface of the mounting base which is provided with the display screen mounting portion.

Optionally, the screen cover is provided with limiting ribs distributed along an edge of the screen cover, the limiting ribs protruding towards a first side of the screen cover and forming the dust-proof portion together with the screen cover by enclosing.

Optionally, the second dust-proof member is a foam.

Optionally, the second end of the second sleeve is threaded to the barrel retaining ring; or
   the second end of the second sleeve is connected to the barrel retaining ring by means of a screw; or
   the second end of the second sleeve is clamped to the barrel retaining ring.

Optionally, the focusing assembly further includes a focusing lens and a retaining ring lens;
   wherein the focusing lens is mounted in the lens mounting portion, and the retaining ring lens is mounted on the barrel retaining ring.

Optionally, the focusing assembly further includes a driving member;
   wherein the driving member is configured to drive the third sleeve to rotate in the rotation direction or the direction opposite to the rotation direction.

Optionally, the focusing assembly further includes at least one of a transmission member and a position sensing member; wherein
   the transmission member is respectively connected to the driving member and to the third sleeve;
   the transmission member is configured to transmit a driving force from the driving member to the third sleeve, such that the third sleeve is rotated in the rotation direction or the direction opposite to the rotation direction; and
   the position sensing member is configured to sense the relative position of the third sleeve and the second sleeve during the rotation of the third sleeve in the rotation direction or the direction opposite to the rotation direction.

Optionally, the focusing assembly further includes a mounting base; wherein
   the mounting base is fixedly connected to or integrally formed with the first end of the second sleeve;
   the position sensing member includes a limiting switch and a limiting piece; wherein
   the limiting switch is disposed on the mounting base, and the limiting piece is disposed on the third sleeve; and
   the limiting switch is configured to trigger the driving member to stop driving the third sleeve to rotate or to drive the third sleeve to rotate in a direction opposite to the current rotation direction when the limiting piece is detected during the rotation of the third sleeve in the rotation direction or the direction opposite to the rotation direction.

In another aspect, embodiments of the present disclosure provide a head-mounted display device including at least one focusing assembly of the above aspect or any optional manner of the above aspect.

BRIEF DESCRIPTION OF DRAWINGS

In order to illustrate technical solutions in the embodiments of the present disclosure more clearly, a brief introduction of the drawings used in the embodiments will be provided herein. Obviously, the drawings described below are merely some embodiments of the present disclosure, those skilled in the art may also obtain other drawings according to these drawings without creative work.

DESCRIPTION OF EMBODIMENTS

In order to make the principles, technical solutions, and advantages of the present disclosure clearer, the following will further describe the embodiments of the present disclosure in detail with reference to the accompanying drawings.

A VR display device is a kind of head-mounted display device, and the VR display device is unable to exhibit its functions perfectly when performing VR displaying unless the VR display device provides a user thereof with a clear field of vision without foreign matters.

Herein, the term "clear" means that a virtual image surface of a picture displayed by the VR display device may be clearly seen by human eyes. A virtual image distance of the VR display device is generally a fixed value designed according to normal human eyesight, and the virtual image surface displayed by the VR display device may be clearly seen by a nearsighted person with myopic glasses. Optionally, the VR display device may include a focusing assembly configured for adjusting the virtual image distance of the VR display device, such that the virtual image surface displayed by the VR display device may be clearly seen by a nearsighted person without myopic glasses.

Herein, the phrase "without foreign matters" means that no foreign matter such as dust is present between a display screen and a lens of the VR display device; and otherwise foreign matters such as dust (if exists) between the display screen and the lens of the VR display device will be magnified during VR displaying since an optical image of the VR display device is a magnified image, which will be clearly seen by a user's eyes and affect the user's visual experience.

Since a current VR display device does not have measures to prevent foreign matters, a focusing assembly of the VR display device needs to be disassembled to remove foreign matters such as dust (if exists) between a display screen and a lens of the VR display device. However, a process of removing foreign matters is complex since a disassembly process and an assembly process of the focusing assembly of the current VR display device are complex.

Embodiments of the present disclosure provide a focusing assembly and a head-mounted display device. The focusing assembly can be simply disassembled and assembled for removing foreign matters conveniently, and is capable of preventing foreign matters such as dust as much as possible from contaminating structures such as a display screen and a lens in the focusing assembly. Reference may be made to the following embodiments for the detailed technical solutions of the present disclosure.

Figure 1:
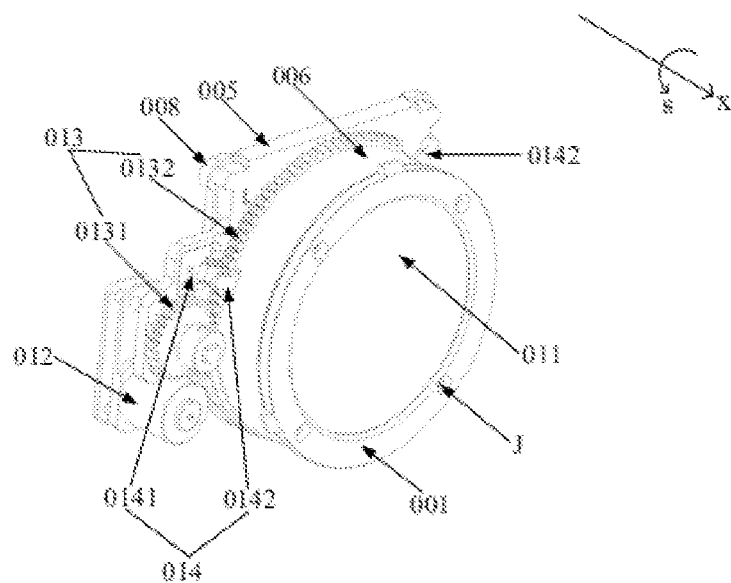
FIG. 1 is a perspective diagram of a focusing assembly according to an embodiment of the present disclosure.
Figure 2:
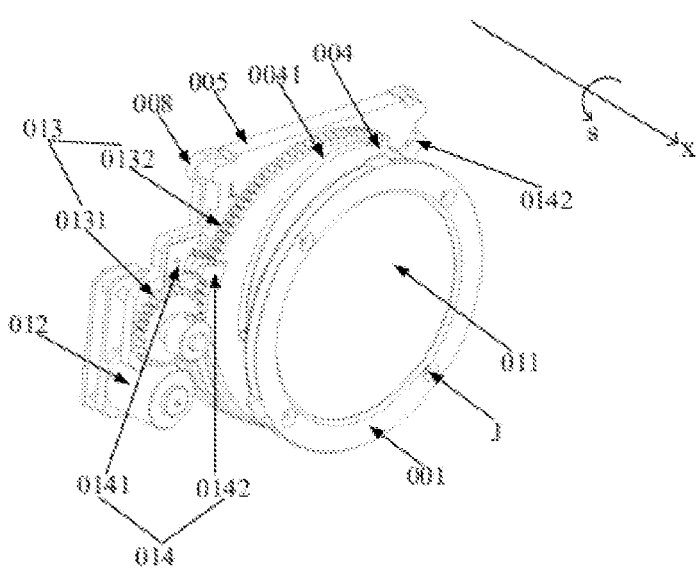
FIG. 2 is a perspective diagram of a partial structure of the focusing assembly shown in FIG. 1.
Figure 3:
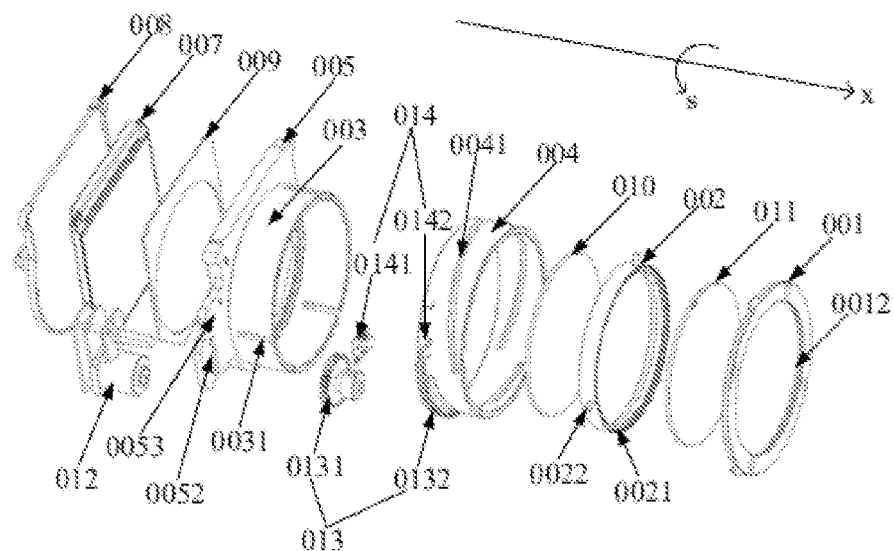
FIG. 3 is an exploded diagram of the structure shown in FIG. 2.
Figure 4:
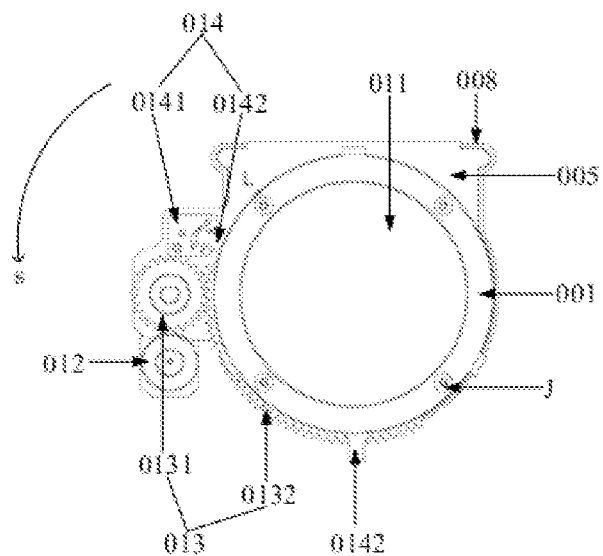
FIG. 4 is a front diagram of the structure shown in FIG. 2.
Figure 5:
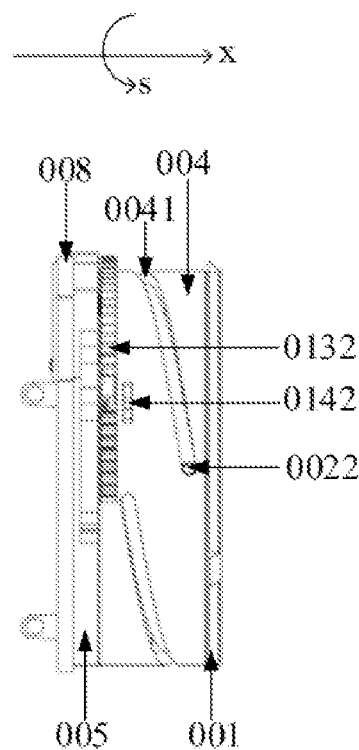
FIG. 5 is a side diagram of the structure shown in FIG. 2.
Figure 6:
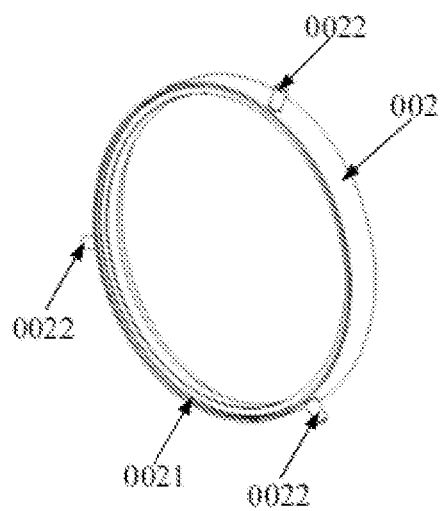
FIG. 6 is a perspective diagram of a first sleeve according to an embodiment of the present disclosure.

Referring to FIG. 1 to FIG. 5, FIG. 1 is a perspective diagram of a focusing assembly according to an embodiment of the present disclosure; FIG. 2 is a perspective diagram of a partial structure of the focusing assembly shown in FIG. 1; FIG. 3 is an exploded diagram of the structure shown in FIG. 2; FIG. 4 is a front diagram of the structure shown in FIG. 2; and FIG. 5 is a side diagram of the structure shown in FIG. 2. Referring to FIG. 1 to FIG. 5, the focusing assembly includes a focusing barrel and a barrel retaining ring 001. The focusing barrel includes a first sleeve 002, a second sleeve 003 and a third sleeve 004 that are sequentially sleeved from inside to outside of the focusing barrel. A first end of the second sleeve 003 is provided with a display screen mounting portion (not shown in FIG. 1 to FIG. 5) for mounting a display screen, an opposite second end of the second sleeve 003 is detachably connected to the barrel retaining ring 001. FIG. 6 is a perspective diagram of a first sleeve 002 according to an embodiment of the present disclosure. Referring to FIG. 6, the first sleeve 002 is provided with a lens mounting portion 0021 for mounting a focusing lens. In the embodiments of the present disclosure, the lens mounting portion 0021 and the display screen mounting portion at the first end of the second sleeve 003 are configured such that the relative position thereof in a focusing direction x of the focusing assembly is adjustable.

Figure 7:
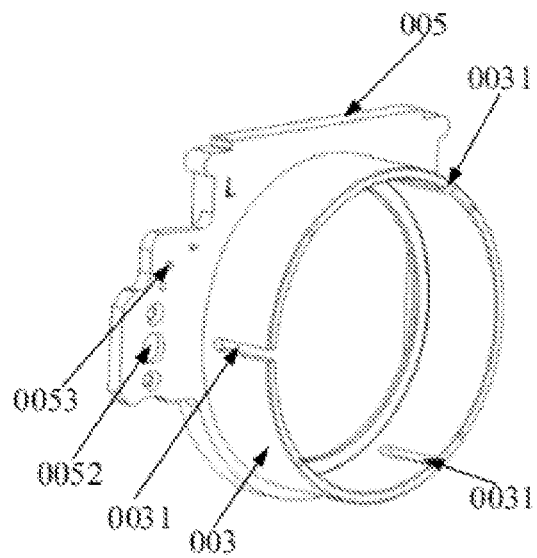
FIG. 7 is a front perspective diagram of an assembled structure of a mounting base and a second sleeve according to an embodiment of the present disclosure.
Figure 8:
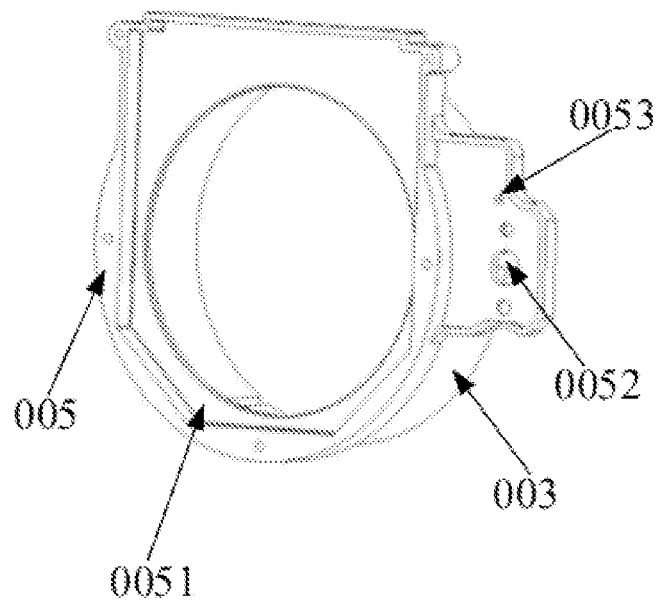
FIG. 8 is a rear perspective diagram of an assembled structure of a mounting base and a second sleeve according to an embodiment of the present disclosure.

Optionally, as shown in FIG. 1 to FIG. 5, the focusing assembly further includes a mounting base 005 fixedly connected to or integrally formed with the first end of the second sleeve 003. For example, referring to FIG. 7 and FIG. 8, FIG. 7 is a front perspective diagram of an assembled structure of a mounting base 005 and a second sleeve 003 according to an embodiment of the present disclosure, and FIG. 8 is a rear perspective diagram of the assembled structure of the mounting base 005 and the second sleeve 003 according to an embodiment of the present disclosure. As shown in FIG. 7 and FIG. 8, the mounting base 005 is integrally formed with the first end of the second sleeve 003, and a display screen mounting portion 0051 is arranged on a surface of the mounting base 005 distal from the second sleeve 003.

In summary, the focusing assembly according to the embodiments of the present disclosure includes a focusing barrel and a barrel retaining ring, wherein the focusing barrel includes a first sleeve, a second sleeve, and a third sleeve that are sequentially sleeved from inside to outside of the focusing barrel, and the barrel retaining ring is detachably connected to the second end of the second sleeve, such that the barrel retaining ring can be conveniently removed from and mounted on the second sleeve, simplifying the disassembly process and assembly process of the focusing assembly.

Optionally, the detachable connection between the second end of the second sleeve 003 and the barrel retaining ring 001 may include: the second end of the second sleeve 003 is threaded to the barrel retaining ring 001; or the second end of the second sleeve 003 is connected to the barrel retaining ring 001 by means of a screw; or the second end of the second sleeve 003 is clamped to the barrel retaining ring. Exemplarily, an external thread may be configured on the second end of the second sleeve 003 while an internal thread may be configured on the barrel retaining ring 001, and the internal thread of the barrel retaining ring 001 may match the external thread of the second end of the second sleeve 003, such that the second end of the second sleeve 003 is threadedly connected to the barrel retaining ring 001; optionally, an internal thread may be configured on the second end of the second sleeve 003 while an external thread may be configured on the barrel retaining ring 001, and the external thread of the barrel retaining ring 001 may match the internal thread of the second end of the second sleeve 003, such that the second end of the second sleeve 003 is threadedly connected to the barrel retaining ring 001. Further exemplarily, the second end of the second sleeve 003 and the barrel retaining ring 001 may have communicating screw holes respectively, where a screw sequentially passes through the screw hole on the barrel retaining ring 001 and the screw hole on the second end of the second sleeve 003 to connect the second end of the second sleeve 003 and the barrel retaining ring 001. Further exemplarily, a clamping hole may be configured on the second end of the second sleeve 003 while a clamping block may be configured on the barrel retaining ring 001, and the clamping block on the barrel retaining ring 001 is fitted into the clamping hole of the second end of the second sleeve 003, such that the second end of the second sleeve 003 is clamped to the barrel retaining ring 001; optionally, a clamping block may be provided on the second end of the second sleeve 003 while a clamping hole may be provided on the barrel retaining ring 001, and the clamping block on the second end of the second sleeve 003 is fitted into the clamping hole of the barrel retaining ring 001, such that the second end of the second sleeve 003 is clamped to the barrel retaining ring 001. As shown in FIG. 1 to FIG. 5, embodiments of the present disclosure are illustrated by taking the second end of the second sleeve 003 and the barrel retaining ring 001 being connected by a screw J as an example.

Figure 9:
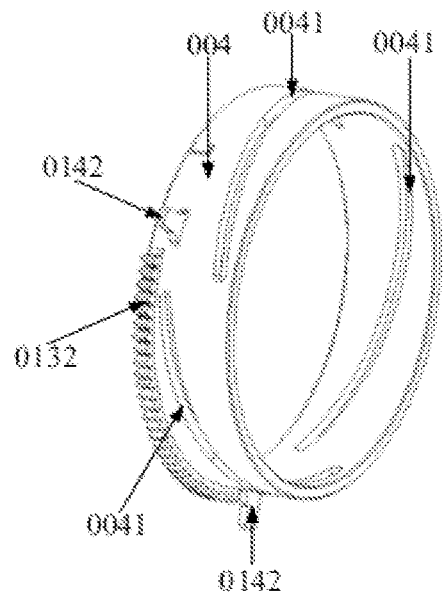
FIG. 9 is a perspective diagram of a third sleeve according to an embodiment of the present disclosure.

Optionally, as shown in FIG. 6, the first sleeve 002 includes a first guiding portion 0022; as shown in FIG. 7, the second sleeve 003 includes a second guiding portion 0031. FIG. 9 is a perspective diagram of a third sleeve 004 according to an embodiment of the present disclosure. As shown in FIG. 9, the third sleeve 004 includes a third guiding portion 0041. Referring to FIG. 1 to FIG. 5, the first guiding portion 0022 matches the second guiding portion 0031 in the focusing direction x and matches the third guiding portion 0041 in a rotation direction s with the focusing direction x as a rotation axis direction; and the third sleeve 004 is configured to drive the third guiding portion 0041 to rotate in the rotation direction s or a direction opposite to the rotation direction s, such that the first sleeve 002 is moved along the focusing direction x under guidance of the first guiding portion 0022 and the second guiding portion 0031, thus adjusting the relative position of the display screen mounting portion 0051 and the lens mounting portion 0021. Those skilled in the art may easily understand that, a focal length may be adjusted to be greater or smaller by rotating the third guiding portion 0041 in the rotation direction s or the direction opposite to the rotation direction s, such that the lens mounting portion 0021 is moved distally from or proximally to the display screen mounting portion 0051 along the focusing direction x. Exemplarily, the focal length may be adjusted to be greater when the third guiding portion 0041 is rotated in the rotation direction s, such that the lens mounting portion 0021 is moved distally from the display screen mounting portion 0051 along the focusing direction x; and the focal length may be adjusted to be smaller when the third guiding portion 0041 is rotated in the direction opposite to the rotation direction s, such that the lens mounting portion 0021 is moved proximally to the display screen mounting portion 0051 along the focusing direction x; optionally, the focal length may be adjusted to be smaller when the third guiding portion 0041 is rotated in the rotation direction s, such that the lens mounting portion 0021 is moved proximally to the display screen mounting portion 0051 along the focusing direction x; and the focal length may be adjusted to be greater when the third guiding portion 0041 is rotated in the direction opposite to the rotation direction s, such that the lens mounting portion 0021 is moved distally from the display screen mounting portion 0051 along the focusing direction x.

Optionally, the first sleeve 002 includes a plurality of first guiding portions 0022 which may be evenly distributed on an outer wall of the first sleeve 002; the second sleeve 003 correspondingly includes a plurality of second guiding portions 0031 which may be evenly distributed on an outer wall of the second sleeve 003; and the third sleeve 004 correspondingly includes a plurality of third guiding portions 0041 which may be evenly distributed on an inner wall of the third sleeve 004. The plurality of first guiding portions 0022 match the plurality of second guiding portions 0031 in a one-to-one correspondence in the focusing direction x, and the plurality of first guiding portions 0022 match the plurality of third guiding portions 0041 in a one-to-one correspondence in the rotation direction s. The third sleeve 004 is configured to drive the plurality of third guiding portions 0041 to rotate in the rotation direction s, such that the first sleeve 002 is moved along the focusing direction x under guidance of the plurality of the first guiding portions 0022 and the plurality of second guiding portions 0031, thus adjusting the relative position of the display screen mounting portion 0051 and the lens mounting portion 0021.

Optionally, the first guiding portion 0022 is a guiding post; the second guiding portion 0031 is a guiding groove extending along a height direction of the second sleeve 003, and specifically, the second guiding portion 0031 may be a linear guiding groove (that is, the extending shape of the second guiding portion 0031 is a straight line); and the third guiding portion 0041 is a guiding groove spirally extending along the inner wall of the third sleeve 004, and specifically, the third guiding portion 0041 may be a spiral guiding groove (that is, the extending shape of the third guiding portion 0041 is a spiral). The plurality of first guiding portions 0022 are arranged in the plurality of second guiding portions 0031 in a one-to-one correspondence in the focusing direction x, and the plurality of first guiding portions 0022 are arranged in the plurality of third guiding portions 0041 in a one-to-one correspondence in the rotation direction s. The relative position of the display screen mounting portion 0051 and the lens mounting portion 0021 may be adjusted by rotating the third sleeve 004 in the rotation direction s and the plurality of third guiding portions 0041 are rotated in the rotation direction s, such that the plurality of first guiding portions 0022 is moved in the focusing direction x along the plurality of second guiding portions 0031 in a one-to-one correspondence. In the embodiments of the present disclosure, the third sleeve 004 may have a maximum rotation radian equal to the radian of the third guiding portion 0041 (a guiding groove which spirally extends), and the first guiding portion 0022 may have a maximum movement distance equal to a corresponding length of the third guiding portion 0041 on the rotation axis thereof. Optionally, the second guiding portion 0031 may be a through groove (that is, the second guiding portion 0031 penetrates through an inner wall of the second sleeve 003), and the third guiding portion 0041 may be a through groove (that is, the third guiding portion 0041 penetrates through the inner wall of the third sleeve 004) or a blind groove (that is, the third guiding portion 0041 does not penetrate through the inner wall of the third sleeve 004), which is not limited in the embodiments of the present disclosure.

Figure 10:
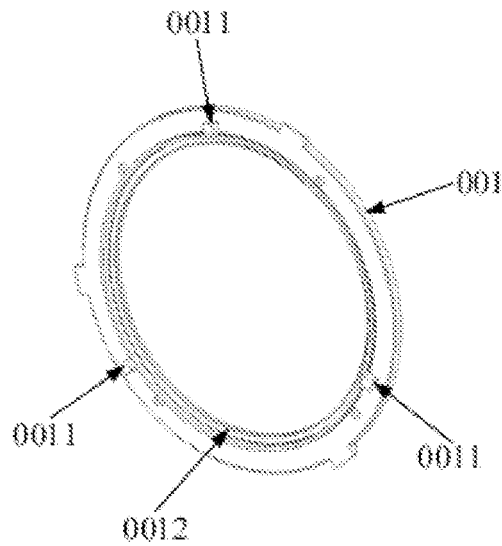
FIG. 10 is a perspective diagram of a barrel retaining ring according to an embodiment of the present disclosure.

Optionally, as shown in FIG. 3 and FIG. 7, the second guiding portion 0031 is a guiding groove extending along the height direction of the second sleeve 003, and penetrates through the second end of the second sleeve 003. FIG. 10 is a perspective diagram of a barrel retaining ring 001 according to an embodiment of the present disclosure. As shown in FIG. 10, the barrel retaining ring 001 includes a plug 0011. After the barrel retaining ring 001 is connected to the second end of the second sleeve 003, the plug 0011 is arranged in the second guiding portion 0031 at the second end of the second sleeve 003, that is, the plug 0011 blocks the opening of the second guiding portion 0031 at the second end of the second sleeve 003, which helps to prevent foreign matters such as dust in the external environment from entering the interior of the focusing barrel from the second guiding portion 0031.

Optionally, the first sleeve 002 includes a plurality of first guiding portions 0022, the second sleeve 003 correspondingly includes a plurality of second guiding portions 0031, third sleeve 004 correspondingly includes a plurality of third guides 0041, and the barrel retaining ring 001 correspondingly includes a plurality of plugs 0011. The first guiding portion 0022 is a guiding post and is arranged on the outer wall of the first sleeve 002, the second guiding portion 0031 is a guiding groove extending along the height direction of the second sleeve 003, and the third guiding portion 0041 is a guiding groove spirally extending along the inner wall of the third sleeve 004. The plurality of first guiding portions 0022 are arranged in the plurality of second guiding portion 0031 in a one-to-one correspondence, the plurality of first guiding portions 0022 are arranged in the plurality of third guiding portions 0041 in a one-to-one correspondence, and the plurality of plugs 0011 are arranged in the plurality of second guiding portion 0031 at the second end of the second sleeve 003 in a one-to-one correspondence, that is, the plurality of plugs 0011 block the openings of the plurality of second guiding portions 0031 at the second end of the second sleeve 003 in a one-to-one correspondence. Exemplarily, the first sleeve 002 includes three first guiding portions 0022, the second sleeve 003 includes three second guiding portions 0031, the third sleeve 004 includes three third guiding portions 0041, and the barrel retaining ring 001 includes three plugs 0011.

Optionally, the third guiding portion 0041 is a guiding groove spirally extending along the inner wall of the third sleeve 004, and penetrates through the inner wall of the third sleeve 003, that is, the third guiding portion 0041 is a spiral through groove. Still referring to FIG. 1, the focusing assembly further includes a first dust-proof member 006 which at least wraps an area of the third sleeve 004 where the third guiding portion 0041 is arranged, which helps to prevent foreign matters such as dust in the external environment from entering the focusing barrel from the third guiding portion 0041. Optionally, the first dust-proof member 006 wraps the outer wall of the third sleeve 004 and the area of the third sleeve 004 where the third guiding portion 0041 is arranged, in this way, the first dust-proof member 006 may be disposed conveniently.

Optionally, the first dust-proof member 006 includes any one of a dust-proof tape or a thermoplastic tube. It is easy for those skilled in the art to understand that the dust-proof tape or thermoplastic tube is only an example of the first dust-proof member 006, and in practice, the first dust-proof member 006 may be any material with a dust-proof effect that may wrap the area of the third sleeve 004 where the third guiding portion 0041 is arranged. For example, the first dust-proof member 006 may be a flexible cloth-like material such as a dust-proof cloth, which is not limited in the embodiments of the present disclosure.

Optionally, a gap between the first sleeve 002 and the second sleeve 003, and a gap between the second sleeve 003 and the third sleeve 004 are filled with dust-proof materials, which helps to prevent foreign matters such as dust in the external environment from entering the focusing barrel from the gap between the first sleeve 002 and the second sleeve 003 and/or the gap between the second sleeve 003 and the third sleeve 004. Optionally, the dust-proof material includes any one of grease or damping oil. Those skilled in the art may easily understand that, the grease or damping oil is only an example of the dust-proof material, and in practice, the dust-proof material may be any material with a dust-proof effect that may be filled in a gap between sleeves, which is not limited in the embodiments of the present disclosure.

Optionally, still referring to FIG. 1 to FIG. 5, the focusing assembly further includes a mounting base 005, a display screen 007, a screen cover 008, and a second dust-proof member 009. The mounting base 005 is fixedly connected to or integrally formed with the first end of the second sleeve 003. Referring to FIG. 1 to FIG. 5 in combination with FIG. 7 and FIG. 8, the mounting base 005 is integrally formed with the first end of the second sleeve 003, and the opening of the first end of the second sleeve 003 is arranged on the mounting base 005; the display screen mounting portion 0051 is arranged on a surface of the mounting base 005 distally from the second sleeve 003; the display screen 007 is mounted in the display screen mounting portion 0051, and a display area of the display screen 007 coincides with the opening of the first end of the second sleeve 003; the screen cover 008 is disposed at a side of the display screen 007 distal from the mounting base 005, and the screen cover 008 and the mounting base 005 enclose the display screen 007; and the second dust-proof member 009 is filled in a gap between the display screen 007 and the mounting base 005. Herein the display screen 007 enclosed by the screen cover 008 and the mounting base 005 may prevent the display screen 007 from being exposed in the external environment and thereby prevent the display screen 007 from being contaminated by foreign matters such as dust in the external environment; while the second dust-proof 009 being filled in the gap between the display screen 007 and the mounting base 005 may be contributive to prevent foreign matters such as dust in the external environment from entering the display area of the display screen 007 through the gap between the display screen 007 and the mounting base 005. In the embodiments of the present disclosure, the screen cover 008, the mounting base 005 and the second dust-proof member 009 cooperate to achieve a dust-proofing effect on the display screen 007.

Figure 11:
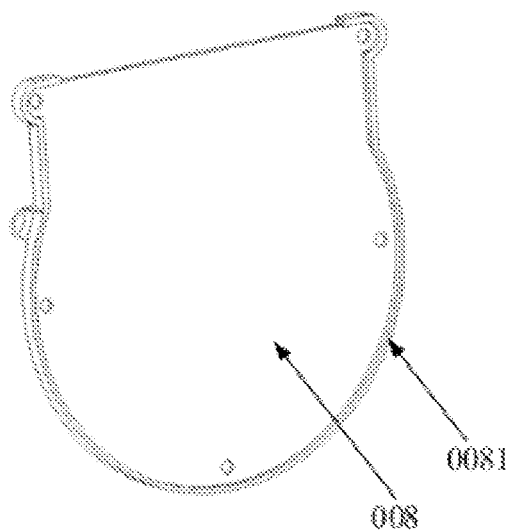
FIG. 11 is a front perspective diagram of a screen cover according to an embodiment of the present disclosure.
Figure 12:
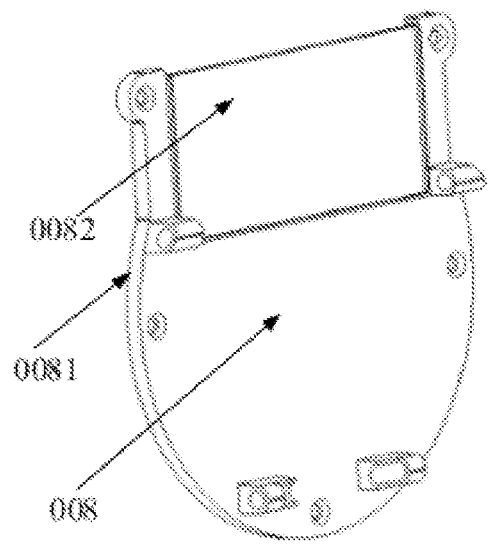
FIG. 12 is a rear perspective diagram of a screen cover according to an embodiment of the present disclosure.

Optionally, the screen cover 008 includes a dust-proof portion that at least encloses the display screen mounting portion 0051, such that the screen cover 008 and the mounting base 005 enclose the display screen 007. Optionally, the dust-proof portion encloses a surface of the mounting base 005 provided with the display screen mounting portion 0051, such that the dust-proof portion encloses the display screen mounting portion 0051. Exemplarily, the screen cover 008 is buckled on the mounting base 005, while limiting ribs 0081 on the screen cover 008 is buckled on the outside of the mounting base 005, the dust-proof portion formed, by enclosing, by the screen cover 008 and the limiting ribs 0081 encloses a surface of the mounting base 005 provided with the display screen mounting portion 0051, such that the dust-proof portion encloses the display screen mounting portion 0051. Optionally, the display screen mounting portion 0051 is a mounting groove. Referring to FIG. 11 and FIG. 12, FIG. 11 is a front perspective diagram of a screen cover 008 according to an embodiment of the present disclosure, and FIG. 12 is a rear perspective diagram of a screen cover 008 according to an embodiment of the present disclosure. As shown in FIG. 11 and FIG. 12, the screen cover 008 includes limiting ribs 0081 distributed along an edge of the screen cover 008. The limiting ribs 0081 protrude towards a first side of the screen cover 008 and forms the dust-proof portion together with the screen cover 008 by enclosing. Exemplarily, a space enclosed by the limiting ribs 0081 and the screen cover 008 may be the dust-proof portion on the screen cover 008.

Optionally, as shown in FIG. 12, the screen cover 008 may further include a circuit mounting portion 0082. The display screen 007 may include a circuit board which may be mounted in the circuit mounting portion 0082. Exemplarily, the circuit board may be a flexible printed circuit board (FPC). The circuit mounting portion 0082 may be an FPC pasting area in which the FPC of the display screen 007 may be pasted. Optionally, the circuit mounting portion 0082 is arranged on a second surface of the screen cover 008 which is opposite to a first surface of the screen cover 008 on the first side of the screen cover 008.

Optionally, the second dust-proof member 009 may be a foam. Those skilled in the art may easily understand that, the second dust-proof member 009 may be any material with a dust-proof effect that may be filled in a gap between the display screen 007 and the mounting base 005, which is not limited in the embodiments of the present disclosure.

Optionally, the screen cover 008 may be detachably connected to the mounting base 005, such that the screen cover 008 may be conveniently removed from and mounted on the mounting base 005. In the embodiments of the present disclosure, the detachable connection between the screen cover 008 and the mounting base 005 may include: the screen cover 008 is connected to the mounting base 005 by means of a screw; or the screen cover 008 is clamped to the mounting base 005. Exemplarily, the screen cover 008 and the mounting base 005 may have communicating screw holes, where a screw sequentially passes through the screw hole on the screen cover 008 and the screw hole on the mounting base 005 to connect the screen cover 008 and the mounting base 005. Further exemplarily, a clamping hole may be provided on the screen cover 008 while a clamping block may be provided on the mounting base 005, and the clamping block on the mounting base 005 is fitted into the clamping hole on the screen cover 008, such that the screen cover 008 is clamped to the mounting base 005; optionally, a clamping block may be configured on the screen cover 008 while a clamping hole may be configured on the mounting base 005, and the clamping block on the screen cover 008 is fitted into the clamping hole on the mounting base 005, such that the screen cover 008 is clamped to the mounting base 005. Exemplarily, embodiments of the present disclosure, are illustrated by taking the screen cover 008 and the mounting base 005 being connected by a screw as an example.

Optionally, still referring to FIG. 1 to FIG. 5, the focusing assembly further includes a focusing lens 010 and a retaining ring lens 011, wherein the focusing lens 010 is mounted in the lens mounting portion 0021 of the first sleeve 002, and the retaining ring lens 011 is mounted on the barrel retaining ring 001. Optionally, as shown in FIG. 10, the barrel retaining ring 001 includes a lens mounting portion 0012 in which the retaining ring lens 011 is mounted. Exemplarily, the focusing lens 010 is pasted in the lens mounting portion 0021, and the retaining ring lens 011 is pasted in the lens mounting portion 0012. In the focusing assembly according to the embodiments of the present disclosure, the relative position of the retaining ring lens 011 and the display screen 007 is fixed, and the relative position of the focusing lens 010 and the display screen 007 is adjustable; and a focal length may be adjusted by adjusting the position of the focusing lens 010 relative to the display screen 007.

Optionally, still referring to FIG. 1 to FIG. 5, the focusing assembly further includes a driving member 012 which is configured to drive the third sleeve 004 to rotate in the rotation direction s or the direction opposite to the rotation direction s. As shown in FIG. 3, FIG. 7 and FIG. 8, the mounting base 005 includes a driving mounting portion 0052 in which the driving member 012 is mounted. Exemplarily, the driving mounting portion 0052 may be a mounting hole in which a power output shaft of the driving member 012 is mounted. The driving member 012 may be a motor.

Optionally, still referring to FIG. 1 to FIG. 5, the focusing assembly further includes a transmission member 013. The transmission member 013 is respectively connected to the driving member 012 and to the third sleeve 004 and is configured to transmits a driving force from the driving member 012 to the third sleeve 004, such that the third sleeve 004 is rotated in the rotation direction s or the direction opposite to the rotation direction s. Optionally, the transmission member 013 may include a transmission wheel 0131 and a transmission strip 0132. The transmission wheel 0131 includes a shaft fixedly connected to the power output shaft of the driving member 012; the transmission strip 0132 is disposed on an outer wall of the first end of the third sleeve 004 (one end proximal to the mounting base 005 of two opposite ends of the third sleeve 004); and the transmission wheel 0131 is meshed with the transmission strip 0132. A driving force of the driving member 012 is outputted to the transmission wheel 0131 through the power output shaft to rotate the transmission wheel 0131, the transmission wheel 0131 drives the transmission strip 0132 to rotate in the rotation direction s or the direction opposite to the rotation direction s, such that the transmission strip 0132 drives the third sleeve 004 to rotate in the rotation direction s or the direction opposite to the rotation direction s, and thus the transmission member 013 transmits the driving force of the driving member 012 to the third sleeve 004. Optionally, the transmission strip 0132 is fixedly connected to or integrally formed with the third sleeve 004, as shown in FIG. 1 to FIG. 5 and FIG. 9. Embodiments of the present disclosure are illustrated by tasking the transmission strip 0132 being integrally formed with the third sleeve 004 as an example.

Optionally, still referring to FIG. 1 to FIG. 5, the focusing assembly further includes a position sensing member 014. The position sensing member 014 is configured to sense the relative position of the third sleeve 004 and the second sleeve 003 during the rotation of the third sleeve 004 in the rotation direction s or the direction opposite to the rotation direction s.

Optionally, the position sensing member 014 includes a limiting switch 0141 and a limiting piece 0142. The limiting switch 0141 is disposed on the mounting base 005, and the limiting piece 0142 is disposed on the third sleeve 004. The limiting switch 0141 is configured to trigger the driving member 012 to stop driving the third sleeve 004 to rotate or to drive the third sleeve 004 to rotate in a direction opposite to the current rotation direction when the limiting piece 0142 is detected during the rotation of the third sleeve 004 in the rotation direction s or the direction opposite to the rotation direction s. As shown in FIG. 3, FIG. 7 and FIG. 8, the mounting base 005 includes a switch mounting portion 0053 by which the limiting switch 0141 is disposed on the mounting base 005. Exemplarily, the switch mounting portion 0053 may be a mounting hole, and the limiting switch 0141 may be a light detection switch.

Optionally, the position sensing member 014 may include a plurality of limiting pieces 0142. The plurality of limiting pieces 0142 are disposed on the outer wall of the third sleeve 004 proximal to the transmission strip 0132, and the limiting pieces 0142 are fixedly connected to or integrally formed with the third sleeve 004. Exemplarily, as shown in FIG. 1 to FIG. 5 and FIG. 9, the position sensing member 014 includes two limiting pieces 0142 which are disposed on the outer wall of the third sleeve 004 proximal to both ends of the transmission strip 0132 and the two limiting pieces 0142 are integrally formed with the third sleeve 004.

Those skilled in the art may easily understand that the structure of the focusing assembly provided in the embodiments of the present disclosure is only exemplary. In addition to the structure described in the above embodiments, the focusing assembly may include other structures, which will not be repeated herein.

For the focusing assembly provided in the embodiments of the present disclosure, a focal length may be manually adjusted by a user or may be automatically adjusted by the focusing assembly. The focusing process of the focusing assembly is described in two cases as follows.

A first case: the focal length is automatically adjusted by the focusing assembly.

Exemplarily, the driving member 012 drives the transmission wheel 0131 to rotate by outputting a driving force to the transmission wheel 0131 from its power output shaft driven by the driving member 012 to rotate in a first direction. The transmission wheel 0131 drives the transmission strip 0132 meshed with the transmission wheel 0131 to rotate in the rotation direction s. The third sleeve 004 is rotated in the rotation direction s by following the transmission strip 0132, such that the plurality of third guiding portions 0041 on the third sleeve 004 are rotated in the rotation direction s by following the third sleeve 004. The plurality of third guiding portions 0041 drive the plurality of first guiding portions 0022 on the first sleeve 002 to move distally from the mounting base 005 in the focusing direction x under guidance of the plurality of second guiding portions 0031 on the second sleeve 003, such that the first sleeve 002 moves distally from the mounting base 005 in the focusing direction x and thus the focusing lens 010 moves distally from the display screen 007 in the focusing direction x, the focal length of the focusing assembly is adjusted to be greater (that is, the distance between the focusing lens 010 and the display screen 007 is adjusted to be greater). During the rotation of the third sleeve 004 in the rotation direction s, the limiting piece 0142 is rotated in the rotation direction s by following the third sleeve 004. When the limiting piece is detected by the limiting switch 0141 on the mounting base 005, the limiting switch 0141 may trigger the driving member 012 to drive the transmission wheel 0131 to rotate in a direction opposite to its current rotation direction by driving its power output shaft to rotate in a second direction. The transmission 0131 drives the transmission strip 0132 meshed with the transmission wheel 0131 to rotate in the direction opposite to the rotation direction s. The third sleeve 004 is rotated in the direction opposite to the rotation direction s by following the transmission strip 0132, such that the plurality of third guiding portions 0041 on the third sleeve 004 are rotated in the direction opposite to the rotation direction s by following the third sleeve 004. The plurality of third guiding portions 0041 drive the plurality of first guiding portions 0022 on the first sleeve 002 to move proximally to the mounting base 005 in the focusing direction x under guidance of the plurality of second guiding portions 0031 on the second sleeve 003, such that the first sleeve 002 moves proximally to the mounting base 005 in the focusing direction x and thus the focusing lens 010 moves proximally to the display screen 007 in the focusing direction x, the focal length of the focusing assembly is adjusted to be smaller (that is, the distance between the focusing lens 010 and the display screen 007 is adjusted to be smaller). Optionally, the limiting switch 0141 may trigger the driving member 012 to stop working when the limiting piece 0142 is detected by the limiting switch 0141, which is not limited in the embodiments of the present disclosure.

A second case: the focal length is manually adjusted by a user.

Exemplarily, when a greater focal length of the focusing assembly is needed, a user may manually rotate the third sleeve 004 in the rotation direction s, the plurality of third guiding portions 0041 on the third sleeve 004 are rotated in the rotation direction s by following the third sleeve 004. The plurality of third guiding portions 0041 drive the plurality of first guiding portions 0022 on the first sleeve 002 to move distally from the mounting base 005 in the focusing direction x under guidance of the plurality of second guiding portions 0031 on the second sleeve 003, such that the first sleeve 002 moves distally from the mounting base 005 in the focusing direction x and thus the focusing lens 010 moves distally from the display screen 007 in the focusing direction x, the focal length of the focusing assembly is adjusted to be greater. When a smaller focal length of the focusing assembly is needed, a user may manually rotate the third sleeve 004 in the direction opposite to the rotation direction s, the plurality of third guiding portions 0041 on the third sleeve 004 are rotated in the direction opposite to the rotation direction s by following the third sleeve 004. The plurality of third guiding portions 0041 drive the plurality of first guiding portions 0022 on the first sleeve 002 to move proximally to the mounting base 005 in the focusing direction x under guidance of the plurality of second guiding portions 0031 on the second sleeve 003, such that the first sleeve 002 moves proximally to the mounting base 005 in the focusing direction x, and thus the focusing lens 010 moves proximally to the display screen 007 in the focusing direction x, and the focal length of the focusing assembly is adjusted to be smaller.

In summary, in the focusing assembly according to the embodiments of the present disclosure, the detachable connection between the second sleeve and the barrel retaining ring allows the barrel retaining ring to be conveniently removed from and mounted on the second sleeve. And the detachable connection between the screen cover and the mounting base allows the screen cover to be conveniently removed from and mounted on the mounting base. Usually, it is necessary to disassemble a focusing assembly for maintenance when the focusing assembly fails, and the focusing assembly provided in the embodiments of the present disclosure is convenient for maintenance due to a simple disassembly process thereof.

In the focusing assembly according to the embodiments of the present disclosure, by a cooperation of the mounting base, the screen cover and the first dust-proof member for dust-proof of the display screen, it is conductive to prevent foreign matters in the external environment from contaminating the display screen. The mounting base, the screen cover and the first dust-proof member may seal the first end of the focusing barrel, and the barrel retaining ring, the plug on the barrel retaining ring and the retaining ring lens may seal the second end of the focusing barrel, and a gap between the sleeves is filled with dust-proof materials, thereby preventing foreign matters in the external environment from entering the interior of the focusing barrel from both ends thereof. The second dust-proof member in the focusing assembly may seal the outer wall of the focusing barrel, thereby preventing foreign matters in the external environment from entering the interior of the focusing barrel from the outer wall of the focusing barrel. The focusing assembly according to the embodiments of the present disclosure may perform focusing in exposure to the air without dusting for a long time, and may be convenient in disassembly and assembly processes, such that it is convenient to clean dust on the display screen and/or the focusing lens by disassembling the focusing assembly easily even if the display screen and/or the focusing lens is contaminated by dust entering the focusing assembly.

An assembly process of the focusing assembly according to the embodiments of the present disclosure is described below with reference to FIG. 1 to FIG. 12. Foreign matters such as dust can be prevented from contaminating the display screen and the focusing lens during the assembly process by performing the assembly process in a dust-free workshop. Exemplarily, the assembly process may include the following steps.

In step 101, structures such as the barrel retaining ring, the first sleeve, the second sleeve, the third sleeve, the mounting base, the display screen, the screen cover, the focusing lens, and the retaining ring lens are cleaned.

Exemplarily, structures such as the barrel retaining ring 001, the first sleeve 002, the second sleeve 003, the third sleeve 004, the mounting base 005, the display screen 007, the screen cover 008, the focusing lens 010 and the retaining ring lens 011 may be cleaned and then dried.

In step 102, the second dust-proof member is disposed in the display screen mounting portion of the mounting base.

Exemplarily, the second dust-proof member 009 may be a foam, and may be pasted in the display screen mounting portion 0051 of the mounting base 005 by an optical adhesive which is then cured.

In step 103, the focusing lens is mounted in the lens mounting portion of the first sleeve.

Exemplarily, the focusing lens 010 may be pasted in the lens mounting portion 0021 of the first sleeve 002 by an optical adhesive which is then cured.

In step 104, the retaining ring lens is mounted in the lens mounting portion of the barrel retaining ring.

Exemplarily, the retaining ring lens 011 may be pasted in the lens mounting portion 0012 of the barrel retaining ring 001 by an optical adhesive which is then cured.

In step 105, both the inner wall and the outer wall of the second sleeve are coated with dust-proof materials.

Among them, the dust-proof materials may be any one of grease or damping oil. Exemplarily, the damping oil may be coated on both the inner wall and the outer wall of the second sleeve 003.

In step 106, the display screen is mounted in the display screen mounting portion.

Exemplarily, the display screen 007 is pasted in the display screen mounting portion 0051.

In step 107, the screen cover is detachably connected to the mounting base, such that the screen cover and the mounting base enclose the display screen.

Exemplarily, the screen cover 008 is buckled on a side of the mounting base 005 provided with the display screen mounting portion 0051, such that the screen cover 008 and the mounting base 005 enclose the display screen 007, and the screen cover 008 is connected to the mounting base 005 by a screw.

In step 108, the first sleeve, the second sleeve and the third sleeve are sequentially sleeved from inside to outside of the focusing assembly, such that the plurality of first guiding portions of the first sleeve match the plurality of second guiding portions of the second sleeve in a one-to-one correspondence, and the plurality of first guiding portions of the first sleeve match the plurality of third guiding portions of the third sleeve in a one-to-one correspondence.

Optionally, the first guiding portion 0022 may be a guiding post, the second guiding portion 0031 may be a linear guiding groove, and the third guiding portion 0041 may be a spiral guiding groove.

Exemplarily, firstly, an entirety composed of the display screen 007, the screen cover 008 and the mounting base 005 are arranged on a mounting table, such that the second sleeve 003 faces a side of the mounting base 005 distal from the mounting table; next, the first sleeve 002 is arranged on the end surface of the second end of the second sleeve 003, such that the plurality of first guiding portions 0022 of the first sleeve 002 and the plurality of second guiding portions 0031 of the second sleeve 003 are staggered; then, the third sleeve 004 is sleeved outside the first sleeve 002, such that the plurality of first guiding portions 0022 match the plurality of third guiding portions 0041 in a one-to-one correspondence; then, the first sleeve 002 rotates around the axis of the first sleeve 002, such that the plurality of first guiding portions 0022 of the first sleeve 002 are aligned with the plurality of second guiding portions 0031 of the second sleeve 003; and finally an entirety composed of the third sleeve 004 and the first sleeve 002 is moved proximally to the mounting base 005 along the height direction of the second sleeve 003, such that the third sleeve 004 is sleeved outside the second sleeve 003, the first sleeve 002 is sleeved inside the second sleeve 003, and the plurality of first guiding portions 0022 match the plurality of second guiding portions 0031 in a one-to-one correspondence.

In step 109, the barrel retaining ring mounted with the retaining ring lens is detachably connected to the second end of the second sleeve, such that the plurality of plugs on the barrel retaining ring are arranged in the plurality of second guiding portions in a one-to-one correspondence.

Optionally, the second guiding portion 0031 may be a linear guiding groove.

Exemplarily, the barrel retaining ring 001 mounted with the retaining ring lens 011 is arranged on the end surface of the second end of the second sleeve 003, such that the plurality of plugs 0011 on the barrel retaining ring 001 are arranged in the plurality of second guiding portions 0031 in a one-to-one correspondence, and the barrel retaining ring 001 is connected to the second end of the second sleeve 003 by a screw.

In step 110, it is detected whether a foreign matter is present within the field of view of the focusing assembly; if a foreign matter is present within the field of view, step 111 is performed, otherwise step 112 is performed.

Exemplarily, the field of view may be observed by lighting up the display screen 007 to determine whether a foreign matter is present.

In step 111, the foreign matter within the field of view is removed.

Optionally, if the foreign matter within the field of view is present at the display screen 007 side, the screen cover 008 and the display screen 007 may be removed from the mounting base 005 and may be mounted on the mounting base 005 again after removing the foreign matter from the screen cover 008, the display screen 007 and the mounting base 005. If the foreign matter within the field of view is present in the focusing barrel (that is, the foreign matter is present at a side near the eye), the barrel retaining ring 001 and the retaining ring lens 011 may be removed as an entirety from the second end of the second sleeve 003 and may be detachably disposed as an entirety on the second end of the second sleeve 003 again after removing the foreign matter from the focusing lens 010, the retaining ring lens 011, the barrel retaining ring 001 and a space in the interior of the focusing barrel.

It should be noted that the step 110 and step 111 may be performed repeatedly until no foreign matter is present within the field of view of the focusing assembly, and then the following step 112 is performed.

In step 112, the third sleeve is wrapped by the first dust-proof member, such that the first dust-proof member wraps the outer wall of the third sleeve and an area of the third sleeve where the third guiding portion is arranged.

Optionally, the first dust-proof member 006 may be any one of a dust-proof tape or a thermoplastic tube.

Exemplarily, lubricating oil may be coated in the plurality of third guiding portions 0041 of the third sleeve 004 and may be uniformized by rotating the third sleeve 004, and a dust-proof tape may be wound around the third sleeve 004, such that the dust-proof tape covers the outer wall of the third sleeve 004 and an area of the third sleeve 004 where the third guiding portion 0041 is arranged.

In step 113, a circuit board of the display screen is mounted in the circuit mounting portion of the screen cover.

Optionally, the circuit board may be an FPC and may be pasted in the circuit mounting portion 0082 of the screen cover 008.

In step 114, the driving member is mounted on the mounting base.

Exemplarily, the mounting base 005 includes the drive mounting portion 0052 in which the driving member 012 may be mounted.

In step 115, the shaft of the transmission wheel is fixedly connected to the power output shaft of the driving member, such that the transmission wheel is meshed with the transmission strip on the third sleeve.

In step 116, the limiting switch is mounted on the mounting base.

After the above steps 101 to 116, the assembling process of the focusing assembly may be completed to acquire the focusing assembly as shown in FIG. 1. Those skilled in the art may easily understand that the sequence of the assembling steps of the focusing assembly may be adjusted appropriately and the amount may also be increased or decreased according to various situations. Any modified method that may be easily conceived by anyone skilled in the art within the technical scope disclosed in the present disclosure should be covered by the protection scope of the present disclosure, which will not be repeated herein.

The focusing assembly according to the embodiments of the present disclosure may achieve an automatic focusing of the focusing lens at short distances, and a dust-proof sealing of the focusing barrel, which helps to prevent foreign matters from entering the interior of the focusing assembly in use. For foreign matters entering the focusing assembly during an assembly process thereof, the focusing assembly may be conveniently disassembled and foreign matters may be removed, which helps to ensure the display effect of the focusing assembly.

On the basis of the same inventive concept, embodiments of the present disclosure further provide a head-mounted display device, which may include at least one focusing assembly as provided in the above-mentioned embodiments. The head-mounted display device may be any display device that may be worn on a human head, such as VR glasses or a VR helmet. Exemplarily, the head-mounted display device may be VR glasses which may include two focusing assemblies as provided in the above-mentioned embodiments, the two focusing assemblies being in a one-to-one correspondence to human eyes.

In the embodiments of the present disclosure, the terms "first", "second" and "third" are only for the purpose of description and should not be construed as indicating or implying relative importance. The term "at least one" means one or more, and "a plurality of" means two or more, unless otherwise. The term "and/or" in the present disclosure is merely configured to describe association relations among associated objects, and may indicate three relationships. For example, "A and/or B" may indicate that A exists alone, or A and B exist simultaneously, or B exists alone. In addition, the character "/" generally indicates that the associated objects are an "OR" relationship.

Described above are merely exemplary embodiments of the present disclosure, and are not intended to limit the present disclosure. Within the spirit and principles of the disclosure, any modifications, equivalent substitutions, improvements, and the like should be within the protection scope of the present disclosure.

What is claimed is:

1. A focusing assembly, comprising: a focusing barrel and a barrel retaining ring,
   wherein the focusing barrel comprises a first sleeve, a second sleeve, and a third sleeve that are sequentially sleeved from inside to outside of the focusing barrel;
   wherein the first sleeve is provided with a lens mounting portion configured to mount a focusing lens, a first end of the second sleeve is provided with a display screen mounting portion configured to mount a display screen, and a second end of the second sleeve is detachably connected to the barrel retaining ring, the first end and the second end being two opposite ends of the second sleeve; and
   wherein the lens mounting portion and the display screen mounting portion are configured such that relative positions thereof in a focusing direction of the focusing assembly is adjustable.

2. The focusing assembly according to claim 1, wherein the first sleeve is provided with a first guiding portion, the second sleeve is provided with a second guiding portion, and the third sleeve is provided with a third guiding portion; and
   wherein the first guiding portion is configured to match the second guiding portion in the focusing direction and to match the third guiding portion in a rotation direction with the focusing direction being a rotation axis direction; and the third sleeve is configured to drive the third guiding portion to rotate in the rotation direction or a direction opposite to the rotation direction, such that the first sleeve is movable along the focusing direction under guidance of the first guiding portion and the second guiding portion to adjust the relative positions of the display screen mounting portion and the lens mounting portion.

3. The focusing assembly according to claim 2, wherein the second guiding portion comprises a guiding groove extending along a height direction of the second sleeve and is configured to penetrate through the second end of the second sleeve, and the barrel retaining ring is provided with a plug in the second guiding portion at the second end of the second sleeve.

4. The focusing assembly according to claim 3, wherein the third guiding portion comprises a guiding groove spirally extending along an inner wall of the third sleeve and is configured to penetrate through the inner wall of the third sleeve; and
   wherein the focusing assembly further comprises: a first dust-proof member at least wrapping an area of the third sleeve where the third guiding portion is arranged.

5. The focusing assembly according to claim 4, wherein the first dust-proof member is configured to wrap an outer wall of the third sleeve and the area of the third sleeve where the third guiding portion is arranged.

6. The focusing assembly according to claim 4, wherein the first dust-proof member comprises any one of a dust-proof tape or a thermoplastic tube.

7. The focusing assembly according to claim 3, wherein the first sleeve is provided with a plurality of first guiding portions, the second sleeve is correspondingly provided with a plurality of second guiding portions, the third sleeve is correspondingly provided with a plurality of third guiding portions, and the barrel retaining ring is correspondingly provided with a plurality of plugs;
   the first guiding portion comprises as a guiding post and is arranged on an outer wall of the first sleeve; the plurality of first guiding portions are arranged in the plurality of second guiding portions in a one-to-one correspondence, the plurality of first guiding portions are arranged in the plurality of third guiding portions in a one-to-one correspondence, and the plurality of plugs are arranged in the plurality of second guiding portions at the second end of the second sleeve in a one-to-one correspondence.

8. The focusing assembly according to claim 2, further comprising a driving member;
   wherein the driving member is configured to drive the third sleeve to rotate in the rotation direction or the direction opposite to the rotation direction.

9. The focusing assembly according to claim 8, further comprising at least one of a transmission member and a position sensing member; wherein
   the transmission member is respectively connected to the driving member and to the third sleeve;
   the transmission member is configured to transmit a driving force from the driving member to the third sleeve, such that the third sleeve is rotated in the rotation direction or the direction opposite to the rotation direction; and the position sensing member is configured to sense the relative position of the third sleeve and the second sleeve during the rotation of the third sleeve in the rotation direction or the direction opposite to the rotation direction.

10. The focusing assembly according to claim 9, further comprising a mounting base; wherein the mounting base is fixedly connected to or integrally formed with the first end of the second sleeve;

the position sensing member comprises a limiting switch and a limiting piece;

the limiting switch is disposed on the mounting base, and the limiting piece is disposed on the third sleeve; and the limiting switch is configured to trigger the driving member to stop driving the third sleeve to rotate or to drive the third sleeve to rotate in a direction opposite to the current rotation direction when the limiting piece is detected during the rotation of the third sleeve in the rotation direction or the direction opposite to the rotation direction.

11. The focusing assembly according to claim 1, wherein a gap between the first sleeve and the second sleeve, and a gap between the second sleeve and the third sleeve are both filled with a dust-proof material.

12. The focusing assembly according to claim 11, wherein the dust-proof material comprises any one of grease or damping oil.

13. The focusing assembly according to claim 1, further comprising: a mounting base, the display screen, a screen cover, and a second dust-proof member;

wherein the mounting base is fixedly connected to or integrally formed with the first end of the second sleeve; the display screen mounting portion is arranged on a surface of the mounting base distal from the second sleeve, and the display screen is mounted in the display screen mounting portion; the screen cover is disposed at a side of the display screen distal from the mounting base; the screen cover and the mounting base enclose the display screen; and the second dust-proof member is filled in a gap between the display screen and the mounting base.

14. The focusing assembly according to claim 13, wherein the screen cover is detachably connected to the mounting base.

15. The focusing assembly according to claim 13, wherein the screen cover is provided with a dust-proof portion which at least encloses the display screen mounting portion, such that the screen cover and the mounting base enclose the display screen.

16. The focusing assembly according to claim 15, wherein the screen cover is provided with limiting ribs distributed along an edge of the screen cover, the limiting ribs protruding toward a first side of the screen cover and forming the dust-proof portion together with the screen cover by enclosing.

17. The focusing assembly according to claim 13, wherein the second dust-proof member is a foam.

18. The focusing assembly according to claim 1, wherein the second end of the second sleeve is threaded to the barrel retaining ring; or the second end of the second sleeve is connected to the barrel retaining ring by means of a screw; or the second end of the second sleeve is clamped to the barrel retaining ring.

19. The focusing assembly according to claim 1, further comprising: the focusing lens and a retaining ring lens;

wherein the focusing lens is mounted in the lens mounting portion, and the retaining ring lens is mounted on the barrel retaining ring.

20. A head-mounted display device, comprising at least one focusing assembly comprising a focusing barrel and a barrel retaining ring, wherein the focusing barrel comprises a first sleeve, a second sleeve, and a third sleeve that are sequentially sleeved from inside to outside of the focusing barrel;

wherein the first sleeve is provided with a lens mounting portion configured to mount a focusing lens, a first end of the second sleeve is provided with a display screen mounting portion configured to mount a display screen, and a second end of the second sleeve is detachably connected to the barrel retaining ring, the first end and the second end being two opposite ends of the second sleeve; and wherein the lens mounting portion and the display screen mounting portion are configured such that relative positions thereof in a focusing direction of the focusing assembly is adjustable.

\* \* \* \* \*